US008868648B2

(12) United States Patent
Lutter et al.

(10) Patent No.: US 8,868,648 B2
(45) Date of Patent: Oct. 21, 2014

(54) ACCESSING OPEN DATA USING BUSINESS INTELLIGENCE TOOLS

(75) Inventors: Steffen Lutter, Paris (FR); Xiaohui Xue, Paris (FR); Mythili Gopalakrishnan, Los Altos, CA (US); Peter Snowdon, Paris (FR)

(73) Assignee: Business Objects Software Ltd., Dublin (IE)

( * ) Notice: Subject to any disclaimer, the term of this patent is extended or adjusted under 35 U.S.C. 154(b) by 318 days.

(21) Appl. No.: 13/470,949

(22) Filed: May 14, 2012

(65) Prior Publication Data

US 2013/0304799 A1 Nov. 14, 2013

(51) Int. Cl.
G06F 15/16 (2006.01)

(52) U.S. Cl.
USPC ............................ 709/203; 709/230; 709/246

(58) Field of Classification Search
None
See application file for complete search history.

(56) References Cited

U.S. PATENT DOCUMENTS

| | | | |
|---|---|---|---|
| 6,748,374 B1 | 6/2004 | Madan et al. | |
| 7,886,289 B2 | 2/2011 | Anand et al. | |
| 7,933,896 B2* | 4/2011 | Dexter | 707/722 |
| 8,725,750 B1 | 5/2014 | Waye et al. | |
| 8,762,946 B2 | 6/2014 | Howard | |
| 2002/0083099 A1* | 6/2002 | Knauss et al. | 707/513 |
| 2012/0246202 A1* | 9/2012 | Surtani et al. | 707/812 |
| 2012/0246334 A1* | 9/2012 | Yang et al. | 709/232 |
| 2013/0097114 A1* | 4/2013 | Burke et al. | 707/602 |
| 2013/0159530 A1* | 6/2013 | James et al. | 709/226 |
| 2013/0159829 A1* | 6/2013 | James et al. | 715/208 |
| 2014/0149452 A1 | 5/2014 | Nguyen et al. | |
| 2014/0172833 A1 | 6/2014 | Taylor | |

OTHER PUBLICATIONS

"Non-Final Office Action" mailed Jul. 11, 2014, for U.S. Appl. No. 13/755,203, entitled "Systems and Methods for Accessing a NoSQL Database Using Business Intelligence Tools", filed Jan. 31, 2013, 10pgs.
Kossmann, Donald "The State of the Art in Distributed Query Processing", ACM Computing Surveys, vol. 32, No. 4, Dec. 1, 2000, XP002952901, ISSN: 0360-0300, DOI: 10.1145/371578.371598, (pp. 422-469, 48 pages total).
Wikipedia, "Open Data Protocol", Internet Citation, Jan. 24, 2012, XP002719926, retrieved on Feb. 7, 2014, Retrieved from the Internet: URL:http://en.wikipedia.org/w/index.php?title=Open_Data_Protocol&oldid=472912513, 1pg.
Kostadinov, Dimitre et al., "Intégration de données hétérogenes basee sur la qualité", INFORSID 2005, May 26, 2005, XP055115650, (pp. 471-482, 16 pages total), (English Language Abstract).

(Continued)

*Primary Examiner* — Joshua Joo
(74) *Attorney, Agent, or Firm* — Buckley, Maschoff & Talwalkar LLC

(57) ABSTRACT

A method for querying an Open Data Protocol ("opendata") opendata provider includes receiving a relational database query, parsing the relational database query, creating an execution plan, transmitting an opendata query to the opendata provider, transforming a response into a relational format, and providing the transformed response in reply to the relational database query. The method further includes mapping content of an opendata entity data model to a relational model catalog, and processing a portion of the execution plan by an opendata driver implemented at the server. The method can further include the server retrieving document metadata from the opendata provider, building an internal model of the document metadata, and responding to a metadata request. A system for implementing the method and a non-transitory computer readable medium are also disclosed.

18 Claims, 4 Drawing Sheets

(56) References Cited

OTHER PUBLICATIONS

Popfinger, Christopher "Enhanced Active Databases for Federated Information Systems", Apr. 2006, XP055109944, Feb. 9, 2007, retrieved on Mar. 25, 2014, retrieved from the Internet: URL:http://docserv.uni-diesse;dprf/deserv;etsDerovateServ;etDerovate-3447/1447.pdf, 146 pages.

Annoymous: "IBM WebSphere Information Integrator: Accessing and integrating diverse data for the on demand business", White Paper, Jan. 1, 2005, XP002390478, 28pgs.

Bernstein, Phillip A. et al., "Generic Schema Matching, Ten Years Later", Proceedings of the VLDB Endowment, vol. 4, Sep. 3, 2011, XP055115656, (pp. 695-701, 7 pages total).

Collet, Christine et al., "Towards a Mediation System Framework for Transparent Access to Largely Distributed Sources the MediaGrid Project", The MediaGrid Project, Jan. 1, 2004, XP055115697, retrieved on Apr. 28, 2014, retrieved from the Internet: URL:http://hal.archieves-ouvertes.fr/inria-00325262/en/, (pp. 65-78, 14 pages total).

Sabesan, Manivasakan "Querying Data Providing Web Servicess", Digital Comprehensive Summaries of Uppsala Dissertations form the Faculty of Science and Technology 755, Oct. 8, 2010, XP055115582, retrieved on Apr. 28, 2014, retrieved form the Internet: URL:http://uu.diva-portal.org/smash/get/diva2:332200/FULLTEXT01.pdf, 27 pages.

Communication: Extended European Search Report, dated May 9, 2014, for European Application No. 13002331.0-1952 / 2665000, 11pgs.

* cited by examiner

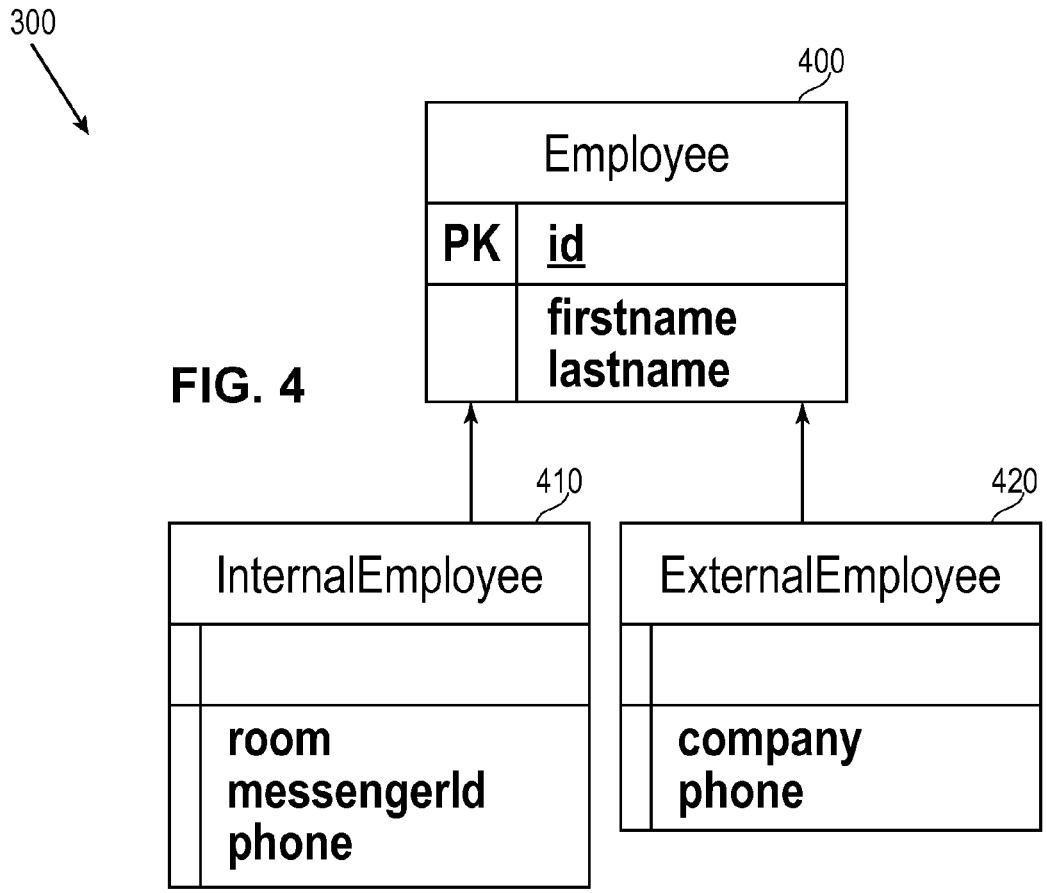

ACCESSING OPEN DATA USING BUSINESS INTELLIGENCE TOOLS

BACKGROUND

There is a vast amount of data available today and data is now being collected and stored at a rate never seen before. Much, if not most, of this data however is locked into specific formats that can be accessed by specific applications. This data is often difficult to access or to integrate into new applications and uses.

The Open Data Protocol (Odata) is a Web protocol for querying and updating data that provides a way to unlock data and free it from application-specific formats. Odata does this by applying and building upon web technologies such as HTTP, Atom Publishing Protocol (AtomPub) and JSON (JavaScript Object Notation) to provide access to information from a variety of applications, services, and data stores. Odata can be used to expose and access information from a variety of sources including, but not limited to, relational databases, file systems, content management systems and traditional web sites.

BRIEF DESCRIPTION OF THE DRAWINGS

FIG. 4 depicts a type having two derived types; and

FIG. 5 depicts an inheritance result table in accordance with some embodiments for the type depicted in FIG. 4.

DETAILED DESCRIPTION

A system and method according to an embodiment can provide business intelligence tools, applications, and/or platforms access to data stored in an Open Data Protocol data source.

The Open Data Protocol (herein referred to as "Odata" or "opendata") is an open protocol that can be used to query, add, and/or update data in a data store coupled to an electronic communication network. Providers of Odata sources may expose their data to access via the electronic communication network by using the Odata protocol. Systems according to an embodiment can provide access to the information in these opendata sources so that business intelligence tools can generate reports using information available via the electronic communication network. In some embodiments, these business intelligence tools can be accessing data using a relational database protocol.

Figure 1:
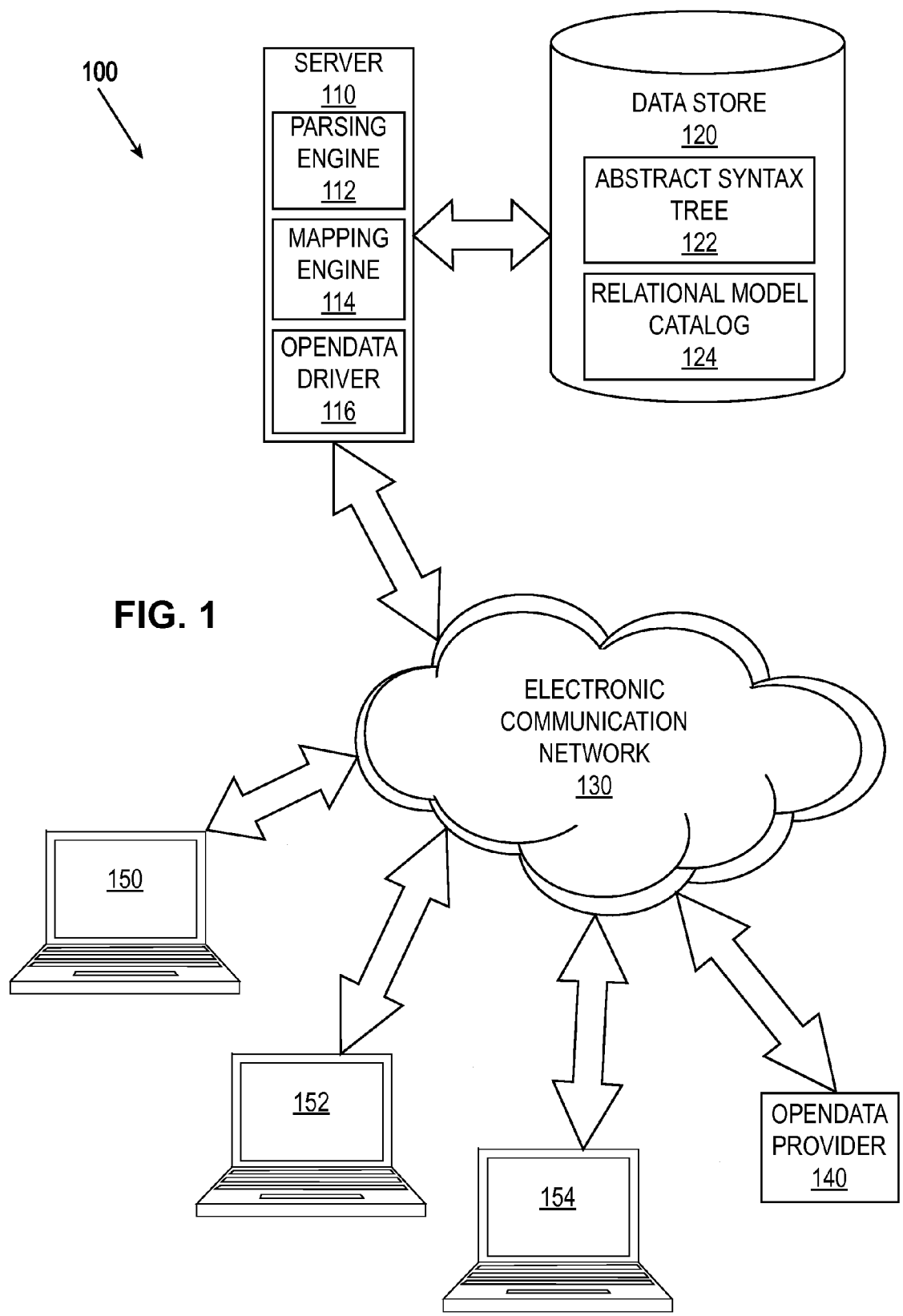
FIG. 1 depicts a system in accordance with some embodiments.

FIG. 1 depicts system 100 in accordance with one or more embodiments. System 100 can include server 110 that can include at least one central controller. The central controller may be a processing unit, a field programmable gate array, discrete analog circuitry, digital circuitry, an application specific integrated circuit, a digital signal processor, a reduced instruction set computer processor, etc. Server 110 may include internal memory (e.g., volatile and/or non-volatile memory devices) coupled to the central controller. The central controller may access a computer application program stored in non-volatile internal memory, or stored in an external memory that can be connected to the central controller via an input/output (I/O) port. The computer program application may include code or executable instructions that when executed may instruct or cause the central controller and other components of the server to perform embodying methods, such as a method of providing responses to a relational database model query by accessing data from an opendata provider.

Server 110 can include parsing engine module 112, mapping engine 114, and opendata driver module 116 that are coupled to the central controller. The parsing engine, mapping engine, and opendata driver can be dedicated hardware, software, and/or firmware modules.

Server 110 can be in communication with data store 120. Data store 120 can be part of an object-relational database management system, a relational database management system, or any other database management system. Data store 120 can be a repository for one or more instantiations of abstract syntax tree 122 and relational model catalog 124 sent to the datastore by opendata driver module 116. Communication between the server (e.g., opendata driver module 116) and data store 120 can be either over electronic communication network 130, or a dedicated communication path. In another embodiment, opendata driver 116 can store abstract syntax tree 122 and relational model catalog 124 in memory internal to the server.

Electronic communication network 130 can be, can comprise, or can be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that techniques and systems disclosed herein are not limited by the nature of network 130.

Connected to server 110 via electronic communication network 130 are one or more client computer(s) 150, 152, 154. The client computers can be any type of computing device suitable for use by an end user (e.g., a personal computer, a workstation, a thin client, a netbook, a notebook, tablet computer, etc.). The client computer can be coupled to a disk drive (internal and/or external). The client computers can include a business intelligence tool application or any application that can pull data using relational database queries (e.g., data migration tools, management tools that can present data in graphic form (tabular, charts, etc.), and the like). The business intelligence tool application can, for example, be based on a relational database model, such as a table that is organized into rows and columns.

A business intelligence tool can utilize graphs, charts, and conditional highlighting; drill down into, and across, reports; sort, filter, and format data; model scenarios visually; provide pre-integrated, pretested solutions; provide a combined resource planning and solution to consolidate data. Queries can include, for example, (i) projection; (ii) filtering; (iii) ordering; (iv) grouping; (v) an aggregate function; (vi) a nested query; and/or (vii) joining sales data, purchase order data, and/or information about employees from one or more data sources in the form of a table or report. The user might direct a query to, and receive data from, various data sources (either coupled locally to the client computer or via electronic communication network 130). Embodying systems and methods parse, map, and/or transform the relational database request so that data can be made accessible to the business intelligence tool from an opendata provider.

Connected to the electronic communication network can be opendata provider 140. Opendata provider 140 can be coupled to an opendata data source. Data within the opendata data source can be organized according to the Open Data Protocol and opendata provider 140 can include applications that can expose data within the opendata data source. However, the systems and methods presented herein operate independent of the particular specifics regarding the configuration of the opendata provider and/or the opendata source. For purposes of this disclosure, the opendata provider and opendata source can be viewed as "black boxes" that receive queries and provide responses as described below.

By way of example, server 110 can be implemented as ConnectionServer, a component used by SAP Business Objects Enterprise (BOE) products (SAP, Walldorf, Germany) to connect to various data sources. Server 110 further can include opendata driver module 116 that is configured to provide support for relational database query operations that may not be defined in the Odata protocol, or those queries not implemented by the particular developer of opendata provider 140 even though supported by the Odata protocol standard. The opendata driver module can be used to perform relational database query operations that were not included by the application developer for the one or more applications resident on an opendata provider. Accordingly, server 110 and opendata driver module 116 permit connection to one or more opendata providers so that business intelligence reporting can access data from opendata data sources.

Data can be requested by using uniform resource identifiers (URI) and implementing representational state transfer (REST) principles. Data can be exposed in an Entity Data Model, which can implement an Entity Relationship Model. According to some embodiments, EntitySets, AssociationSets and FunctionImports can be mapped, transformed, and represented as relational database objects to permit integration to business intelligence tools (for example, BOE products). In accordance with these embodiments, these database objects can be queried using relational database queries (e.g., Structured Query Language (SQL)). The relational database queries can be mapped to Odata requests supported by the opendata provider for processing. Other relational database query operations not supported by the opendata provider can be processed by opendata driver 116.

A business intelligence tool can communicate with server 110 to obtain access to an opendata data provider via an application program interface (API). In accordance with an embodiment, the API used by the business intelligence tool can be the same API it might use to access other types of data sources, such as relational database management systems. Server 110 can establish a communication connection with open data provider 142 to download metadata document(s). The metadata documents can be used to build an internal metadata models. These metadata models may be located in server 110 internal memory, or an external memory connected to the server—for example data store 120. Embodying methods can adapt an OData Entity Data Model to a relational model that is exposed by server 110 to the business intelligence tool. The business intelligence tool can query metadata and data from the opendata data source as it would any other data source.

Figure 2:
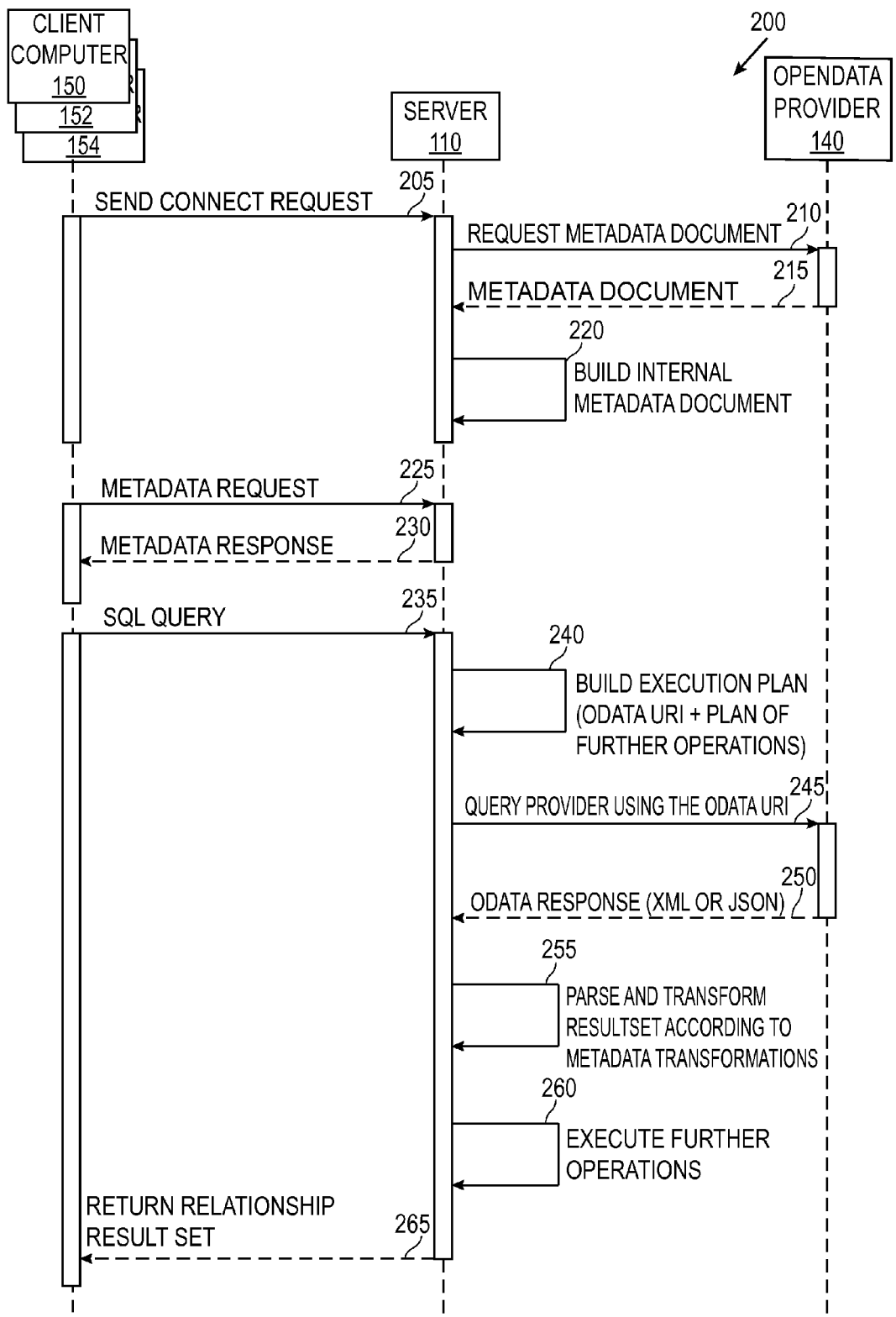
FIG. 2 depicts a process in accordance with some embodiments.

FIG. 2 depicts process 200 that can access an opendata provider to obtain a response to a relational database query request in accordance with some embodiments. The business intelligence tool on client computer 150, 152, 154 can send a connection request, step 205, to server 110. In some embodiments, server 110 can be a component that can be used as a library of the business intelligence tool. A driver operating on server 110 can request (step 210), for example, a metadata document from opendata provider 140. The opendata provider can obtain the requested metadata document from an opendata data source and return the metadata document, step 215 to the server. However, the systems and methods presented herein operate independent of the particular specifics regarding the configuration(s) of the opendata provider and/or the opendata source. The server can download the metadata document and build an internal model, step 220, using transformations described below. The metadata document can be parsed by parsing engine 112 and mapped (e.g., transformed) by mapping engine 114. The internal model can be stored in data store 120.

In accordance with an embodiment, a metadata request, step 225, received at the server from the business intelligence tool can be mapped to the data in the internal model to generate a response, step 230.

Further, in accordance with some embodiments, a relational database request (e.g., a SQL query) sent by the business intelligence tool, step 235 can be parsed and transformed to an abstract syntax tree that may be stored in data store 120. Opendata driver 116 can create an execution plan, step 240. This execution plan can be based on the relational database request received at step 235. The execution plan can include Odata operations supported by the opendata provider, as well as further operations which might not be supported by the opendata provider's configuration.

The server can transmit an opendata query, step 245, containing supported operations to the opendata provider. This opendata query can use an Odata protocol URI, as described above. A response from the opendata provider to the server, step 250, can be a document, file, etc. and may, for example, by in XML or JSON format. This response can be parsed and transformed to a relational format according to the metadata transformations, step 255. Additional operations, which might not have been processed by the opendata provider, can be processed at the server by opendata driver 116, step 260. A result set can be returned to the business intelligence tool, step 265.

Figure 3:
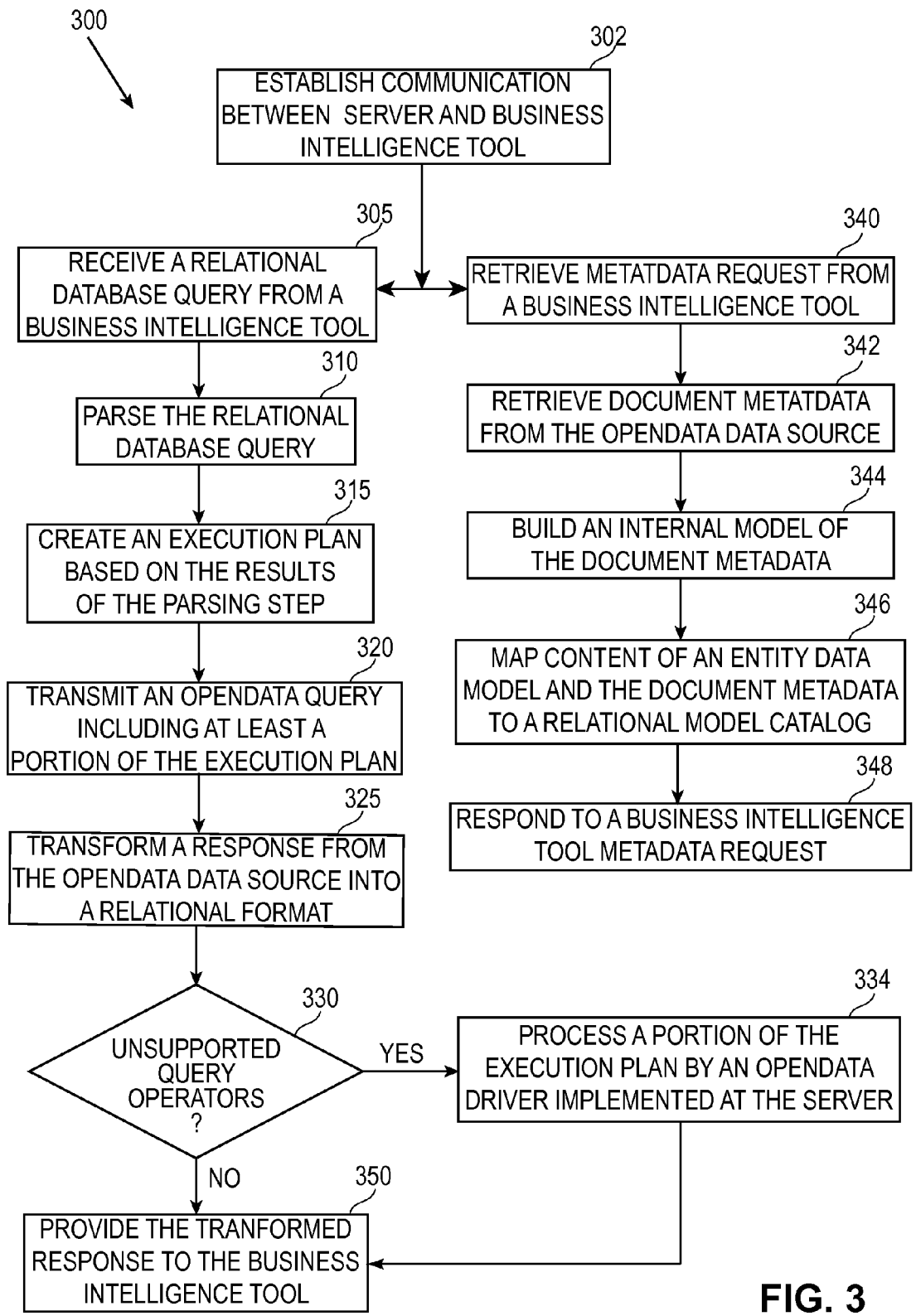
FIG. 3 depicts flow diagram 300 in accordance with an embodiment of FIG. 2.

FIG. 3 depicts a flow diagram for process 300 in accordance with at least one embodiment depicted in FIG. 2. Process 300 can begin by establishing communication between server 110 and a business intelligence tool, step 302. If server 110 receives a relational database query from a business intelligence tool, process 300 can continue at step 305. If server 110 receives a request for metadata from a business intelligence tool, process 300 can continue at step 340 (described below).

The relational database query received at step 305 can be parsed, step 310, using parsing engine module 112. An execution plan can be created, step 315, by opendata driver 116 based on the results of the step 310. The execution plan can contain both opendata operations supported by opendata provider 140, and non-supported opendata operations. At least a portion of the execution plan containing supported operations can be sent to the opendata provider for processing, step 320. A response from the opendata data source can be transformed, step 325, into a relational format. The transformation of the response can be performed in mapping engine 114.

If the relational database query contained operators not supported by the opendata provider, step 330, process 300 can continue at step 334. If there were no unsupported query operators, process 300 can continue at step 350.

The portion of the execution plan containing non-supported operations can be processed at server 110 by opendata driver 116, step 334. In one implementation, opendata driver 116 may also process at least a portion of the supported operations.

The response(s) from steps 325 and 334 can be provided to the business intelligence tool at step 350.

In accordance with some embodiments, if a metadata request is received, step 340, by server 110 from a business intelligence tool, process 300 can include retrieving document metadata, step 342, from the opendata provider. A model of the document metadata internal to the server (e.g., stored in data store 120 or in the server internal memory) can be built, step 344. The content of an entity data model and the document metadata can be mapped, step 346, to a relational model catalog (e.g., a table having rows, columns, pages, etc.). The content mapping can be performed by mapping engine 114. In one implementation, this relational model catalog can be the relational model catalog accessed at step 325. Access to the catalog(s) can be performed by mapping engine 114, which is configured to transform relational model queries to opendata queries (and vice versa). A response to the metadata request can be sent from the server (step 348). In some embodiments, steps 342-346 can be performed prior to receiving a request for metadata so that the relational model catalog accessed by mapping engine 114 (step 325, described above) can include document metadata.

An opendata provider can expose data in an opendata source into Entity Data Models (EDM), which can be transformed into relational model formatted data and exposed by an API in server 110, as described above. Mapping and/or transforming between these data formats are described below.

In the Entity Data Model, EntitySets, AssociationSets and FunctionImports can be contained in EntityContainers. Each EntityContainer can be mapped into a qualifier (e.g., a relational model catalog).

In accordance with some embodiments, an EntitySet can be mapped into a table (e.g., a relational model catalog): An entry of an EntitySet can be defined in an EntityType. The key of the EntityType can be translated into the key of the table. A primitive property can be translated into a table column, and a complex property type can be flattened into a set of primitive properties and table columns. By way of example, the following XML file can perform such operations:

```
<EntityType Name="Customer">
<Key>
        <PropertyRef Name="CustomerID" />
</Key>
    <Property Name="CustomerID" Type="Edm.String" />
    <Property Name="CompanyName" Type="Edm.String" />
    <Property Name="ContactName" Type="Edm.String" />
    <Property Name="ContactTitle" Type="Edm.String" />
    <Property Name="Address" Type="Edm.String" />
    <Property Name="City" Type="Edm.String" />
    <Property Name="PostalCode" Type="Edm.String/>
    <NavigationProperty Name="Orders"
Relationship="NorthwindModel.FK_Orders_Customers"
FromRole="Customers" ToRole="Orders" />
    </EntityType>
<EntitySet Name="Customers"
EntityType="NorthwindModel.Customer" />
```

In accordance with an embodiment, an AssociationSet can relate two EntitySets. For example, associations can be instantiated as AssociationSet in Odata, which can be defined by an Association type. If at least one entity's multiplicity is 1 or 0.1, the association can be translated into a referential constraint in each of the two related tables. If both entities' multiplicity are *, the association can be translated into a table, and this table can have a referential constraint to each of the entities.

Deriving from the CSDL (conceptual schema definition language) standard, an attribute "Role" can be mandatory in AssociationEnd elements. Otherwise the role definition could not be resolved. The following XML file is an example of this concept.

```
<Association Name="FK_Orders_Customers">
    <End Role="Customers" Type="NorthwindModel.Customer"
Multiplicity="0..1" />
    <End Role="Orders" Type="NorthwindModel.Order"
Multiplicity="*" />
    <ReferentialConstraint>
        <Principal Role="Customers">
            <PropertyRefName="CustomerID" />
        </Principal>
        <Dependent Role="Orders">
            <PropertyRefName="CustomerID" />
        </Dependent>
    </ReferentialConstraint>
</Association>
<AssociationSet Name="FK_Orders_Customers"
Association="NorthwindModel.FK_Orders_Customers">
    <End Role="Customers" Entity Set="Customers" />
    <End Role="Orders" EntitySet="Orders" />
</AssociationSet>
```

Properties and NavigationProperites can be mapped to one or more columns. Each primitive property can be mapped to one column with the property name as column name. For properties with a complex type, the number of resulting columns can depend on the number of primitive sub-properties. For each primitive property in a complex type one column can be generated. This rule can also apply to nested complex properties. The name of such a generated column can be the concatenation of the name of the properties' complex type and the name of the primitive type in the enclosing complex type separated by a separation character (e.g., "-", "/", etc.), which is not part of the simple identifier in the EDM to avoid name clashes. The following XML file demonstrates this transformation:

```
<ComplexType Name="Person">
<Property Name="Name" Type="Edm.String"/>
<Property Name="Address" Type="Address"/>
</ComplexType>
<ComplexType Name="Address">
<Property Name="City" Type="Edm.String"/>
<Property Name="Street" Type="Street"/>
</ComplexType>
<ComplexType Name="Street">
<Property Name="Name" Type="Edm.String"/>
<Property Name="Number" Type="Edm.Int32"/>
</ComplexType>
```

As described above, using a separation character, this mapping can result in, for example, in columns for Name, Address/City, Address/Street/Name, and Address/Street/Number.

Additionally to declared properties, EntityTypes can have dynamic properties in Odata if the EntityType is declared as OpenEntityType. As those properties are not in the metadata, they are not known to the opendata driver. Consequently, to map these properties into catalog fields, some embodiments can include one or more of the following options. Dynamic properties could be ignored. In this mode, dynamic properties are ignored and would not appear in the result set. Alternatively, a column could be added to the catalog. Column "dynamic_properties" to the EntityType, which can contain a comma separated list of the dynamic property values.

For example, a result set can have any number of properties greater than the two mandatory columns. By way of example, but without limiting embodiments, a result set could contain an additional column "name" and "birthday" that could be mapped to the "dynamic_properties" column. A value could be e.g. "Peter, 1990-10-03".

In accordance with some embodiments, and consistent with an implementation of the Open Data Protocol, type inheritance can be supported by parsing engine 112, mapping engine 114, and opendata driver 116.

In the Odata Entity Data Model, an EntityType can inherit from another EntityType, and a ComplexType can inherit from another ComplexType. Additionally, both EntityType and ComplexType can be abstract. Consequently, EntitySets with a declared type X can contain entities of the non-abstract type X and non-abstract derived types of X.

Furthermore, derived types can be declared in the same namespace, and also in other namespaces. Adding a Using directive to a namespace can alter the return types of EntitySets in a "used" namespace, as now EntitySets of the "used" namespace can also contain derived types of the namespace containing the Using directive.

This is a challenge for mapping to a relational model, because in a relational model all rows are expected to follow the same schema. To solve this problem, in accordance with an embodiment, inherited types can be flattened. For a specific EntitySet, the result schema can be the result of a merge to one general type. This general type can contain the columns of the declared type and all subtypes. To prevent name clashes, columns declared in derived types can be prefixed with the name of the EntityType.

FIG. 4 depicts schematically a type Employee 400 with two derived types InternalEmployee 410 and ExternalEmployee 420. An EntitySet can be defined as <EntitySet Name="Employees" EntityType="Employee"/>, such a defined entityset can contain entities of all three types—e.g., Employee, InternalEmployee and ExternalEmployee—as these types are not abstract.

In a relational model, such as the model constructed in server 110, all types can be represented by one schema. Therefore, the types can be merged into one general schema which can contain the columns of all types. For the example depicted in FIG. 4, the schema would look like shown in FIG. 5.

FIG. 5 depicts inheritance result table 500 in accordance with some embodiments. As can be seen, ID column 500 includes entry for firstname and lastname from type Employee 400, and then properties from InternalEmployee 410 followed by properties from ExternalEmployee 320. In some cases there can still be name clashes. For example, if a table A has a column B_a, and a derived table B has a column A, then the generated name B_a would be the same as the defined B_a in table A. In this situation, an exception can be thrown.

Service operations, exposed as FunctionImports, represent stored procedures in Odata. These service operations can be mapped to stored procedures. Even if a client does not support stored procedures, some Odata providers expose their data only as a FunctionImport. For this reason, opendata driver 116 is configured to map FunctionImports to tables.

Stored procedures can be exposed as tables by using the concept of InputColumns as parameters. Some Odata providers expose their information by stored procedures, and if the client does not support stored procedures data access would not be possible. Therefore, if set in the configuration, two owners can be available where one owner exposes EntitySets as tables and the other owner exposes FunctionImports as tables. Name clashes between EntitySets and FunctionImports with the same name could be avoided.

In some implementations, FunctionImports can be mapped to stored procedures. FunctionImports are described in ServiceOperations in Odata, where a FunctionImport can have any number of input parameters and can define a return type. If there is an association that relates two EntityTypes, there is a NavigationProperty in each of these two EntityTypes to navigate from one entity to the other. Also if there is an association that relates two EntityTypes, there is an AssociationSet between the EntitySets of the respective EntityTypes. Each referential constraint between one entity called principal, and another entity called dependent is mapped into a referential constraint from dependent to principal.

In accordance with some embodiments, SQL operations can be executed by the opendata provider. This ability can impact the amount of data which needs to be transferred over the network and processed by opendata driver 116. Those SQL operations that could be executed by the opendata provider can be mapped to Odata operations which need to be requested as parameter in the resource URI. For example:

Projection
SQL: SELECT ID, Name FROM Suppliers
Odata URI:
http://services.odata.org/Odata/Odata.svc/
   Suppliers?$select=ID,Name
Selection, Sorting
SQL: SELECT*FROM Suppliers WHERE Suppliers.ID=1
ORDER BY Name
Odata URI:
http://services.odata.org/Odata/Odata.svc/
   Suppliers?$filter=ID eq
   1&$orderby=Name Table I provides illustrative examples of mapping representative SQL-99 operators to Odata operations. To obtain the full syntax of an Odata operation, the Open Data Protocol specification should be consulted.

TABLE I

| Operation | SQL-99 | Odata |
|---|---|---|
| Projection | SELECT <attribute_list> | $select=<attribute_list> |
| | SELECT Name, Price FROM Orders | http://host/service.svc/Orders?$select=Name,Price |
| Filter | WHERE <bool_expression> | $filter=<bool_expression> |
| | SELECT * FROM Orders WHERE Country='France' | http://host/service.svc/Orders?$filter=Country eq 'France' |
| Rename | AS | — |
| Sort | ORDER BY <attribute_list> [ASC \| DESC] | $orderby=<attribute_list> [ASC \| DESC] |
| | SELECT * FROM Orders ORDER BY Country | http://host/service.svc/Orders?$orderby=Country |

TABLE I-continued

| Operation | SQL-99 | Odata |
|---|---|---|
| Distinct | DISTINCT<br>SELECT DISTINCT name FROM Orders | — |
| Join * | JOIN<br>SELECT * FROM Orders JOIN Customer | $expand=<expand_expr><br>http://host/service.svc/Orders?$expand=Customer |
| Grouping ** | GROUP BY | — |
| Union, Union All | UNION, UNION ALL | — |

* Currently, there is a limitation for the Join operation: The leftmost entity property must define a NavigationProperty in the EntityType which defines how the data is joined with the target EntityType (structural join).
** In Odata 2.0, only $count is supported as group function. For other groupings, only server specific functions can be used in the query URI. Therefore, there is no mapping from SQL Group By clauses.

As discussed above, there are a few opendata providers that might not provide the full set of operations provided in the Odata standard. Therefore, these capabilities are defined in opendata driver's 116 configuration file, so that the driver can handle operations which are not implemented by the opendata provider.

The "top" operator is used to implement the maxRow parameter in the server.

```
$top=<m>
http://host/service.svc/Orders?$top=15
```

Table II provides illustrative examples of mapping representative SQL-99 filter expressions to Odata filter expressions.

TABLE II

| FILTER EXPRESSIONS | SQL-99 | ODATA |
|---|---|---|
| Conjunction | AND | and |
| Disjunction | OR | or |
| Negate | −x | −x |
| Not | NOT x | !x |
| Multiply | x * y | x mul y |
| Divide | x/y | x div y |
| Addition | x + y | x add y |
| Subtraction | x − y | x sub y |
| Modulo | x % y | x mod y |
| Less than | x < y | x lt y |
| Greater than | x > y | x gt y |
| Less than or equal | x <= y | x le y |
| Greater than or equal | x >= y | x ge y |
| Equals | x = y | x eq y |
| Not equals | x != y | x ne y |

Table III provides illustrative examples of mapping representative SQL-99 functions to Odata functions. In Odata 2.0, count is currently the only implemented grouping function. Opendata driver 116 can execute another grouping function. This is also the case if the count operation needs to be executed after other operations are completed on the driver's side. This can consume more time, as the full dataset needs to be transferred, and the data needs to be sorted and grouped on the driver side.

TABLE III

| Function | SQL-99 | Odata 2.0 |
|---|---|---|
| Count | count | $count |
| Average | avg | — |
| Minimum | min | — |
| Maximum | max | — |
| Sum | sum | — |

Table IV provides illustrative examples of mapping representative EDM types to ConnectionServer types. Each EDM type can be mapped to one JAVA_Type and one SQL_Type.

TABLE IV

| EDM Primitive Type | SQL_Type | JAVA_Type |
|---|---|---|
| Edm.Binary | SQL_Binary | JAVA_Binary |
| Edm.Boolean | SQL_Bit | JAVA_Byte |
| Edm.Byte | SQL_SmallInt | JAVA_Short |
| Edm.DateTime | SQL_TimeStamp | JAVA_TimeStamp |
| Edm.Decimal | SQL_Decimal | JAVA_BigDecimal |
| Edm.Double | SQL_Double | JAVA_Double |
| Edm.Single | SQL_Float | JAVA_Float |
| Edm.Guid | SQL_VarChar | JAVA_String |
| Edm.Int16 | SQL_SmallInt | JAVA_Short |
| Edm.Int32 | SQL_Integer | JAVA_Int |
| Edm.Int64 | SQL_BigInt | JAVA_Long |
| Edm.SByte | SQL_SmallInt | JAVA_Short |
| Edm.String | SQL_VarChar | JAVA_String |
| Edm.Time | SQL_Time | JAVA_Time |
| Edm.DateTimeOffset | SQL_VarChar | JAVA_String |

In accordance with some embodiments, opendata driver 116 can connect to an opendata provider so that a business intelligence tool can generate reports by accessing Odata EntitySets, AssociationSets and FunctionImports resident in an opendata data source. A system and method in accordance with an embodiment implements mapping/transforming EntitySets and AssociationSets into relational tables (catalog(s)) and enabling using the Associations to execute structural joins. FunctionImports can be mapped/transformed to either stored procedures, or by choice of the user, to tables. This dual approach for mapping FunctionImports can permit business intelligence tools that do not support stored procedures to access data from an opendata provider that exposes data only by FunctionImports. Inheritance and dynamic properties can be mapped into the relational model.

In accordance with an embodiment of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein such as a method for mapping and/or transforming relational model queries to gain access to data stored in an opendata data source.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and data configurations have been described herein, note that any number of other configurations may be provided in accordance with embodiments of the invention. Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A computer-implemented method for querying an opendata provider in communication with a server via an electronic communication network, the method comprising:
   receiving at the server a relational database query from an application running on a client computer coupled to the electronic communication network;
   parsing by a parsing engine the relational database query;
   creating an execution plan based on the results of the parsing step;
   transmitting an opendata query to the opendata provider, the opendata query including at least a portion of the execution plan;
   retrieving, at the server, document metadata from the opendata provider;
   building an internal model of the document metadata;
   mapping content of at least one opendata entity data model located at the opendata provider and the document metadata to at least one relational model catalog;
   transforming at the server a response from the opendata provider into a relational format; and
   providing the transformed response to the client computer application.

2. The method of claim 1, wherein the parsing step further includes creating an abstract syntax tree based on objects of the relational database query.

3. The method of claim 1, wherein the execution plan contains opendata supported operations that correspond to operations included in the relational database query.

4. The method of claim 1, further including the step of mapping content of at least one opendata entity data model located at the opendata provider to at least one relational model catalog.

5. The method of claim 1, further including:
   processing at least one portion of the execution plan by an opendata driver implemented at the server; and
   providing at least one result of the processing step to the client computer application.

6. The method of claim 5, wherein the opendata driver processes portions of the execution plan containing unsupported operations.

7. The method of claim 5, wherein the at least one result is in a relational format.

8. The method of claim 5, wherein the processing step includes accessing content of at least one relational model catalog, wherein the content of the at least one relational model catalog has a correspondence with content of at least one opendata entity data model located in the opendata provider.

9. The method of claim 1, further including
   responding to a client computer application metadata request based on the internal model.

10. A non-transitory computer readable medium having stored thereon instructions which when executed by a processor cause the processor to perform the method of:
    receiving at a server a relational database query from an application running on a client computer coupled to an electronic communication network;
    parsing by a parsing engine the relational database query;
    creating an execution plan based on the results of the parsing step;
    transmitting an opendata query to an opendata provider coupled to the electronic communication network, the opendata query including at least a portion of the execution plan;
    retrieving, at the server, document metadata from the opendata provider;
    building an internal model of the document metadata;
    mapping content of at least one opendata entity data model located at the opendata provider and the document metadata to at least one relational model catalog;
    transforming at the server a response from the opendata provider into a relational format; and
    providing the transformed response to the client computer application.

11. The non-transitory computer readable medium of claim 10, further including executable instructions to cause a processor to perform the step of mapping content of at least one opendata entity data model located at the opendata provider to at least one relational model catalog.

12. The non-transitory computer readable medium of claim 10, further including executable instructions to cause a processor to perform the steps of:
    processing at least one portion of the execution plan by an opendata driver implemented at the server; and
    providing at least one result of the processing step to the client computer application.

13. The non-transitory computer readable medium of claim 12, wherein the processing step includes executable instructions to cause a processor to perform the step of accessing content of at least one relational model catalog, wherein the content of the at least one relational model catalog has a correspondence with content of at least one opendata entity data model located in the opendata provider.

14. The non-transitory computer readable medium of claim 10, further including executable instructions to cause a processor to perform the step of
    responding to a client computer application metadata request based on the internal model.

15. The non-transitory computer readable medium of claim 10, wherein the parsing step includes executable instructions to cause a processor to perform the step of creating an abstract syntax tree based on objects of the relational database query.

16. A system comprising:
    a server connected to an electronic communication network, the server including a control processor,
      wherein a parsing engine, a mapping engine, and an opendata driver are coupled to the control processor;
    the server being in communication with a data store over at least one of the electronic communication network and a dedicated communication path;
    the server configured to retrieve document metadata from an opendata provider connected to the electronic communication network;
    the mapping engine configured to build an internal model of the document metadata and map content of at least one opendata entity data model located at the opendata provider and the document metadata to at least one relational model catalog; and wherein the system is configured to transform a relational database query received by the server into an execution plan having at least one of a supported opendata operation and an unsupported opendata operation, and the opendata driver is configured to process the unsupported opendata operation at the server.

17. The system of claim 16, further including the parsing engine configured to build the execution plan by transforming the relational database query into opendata operations.

18. The system of claim 16, further including the mapping engine configured to transform a response received from an opendata provider containing an entity data model into a relational model catalog.

* * * * *